(No Model.)
C. S. RUEF.
RIDING LISTER.
No. 549,258.  Patented Nov. 5, 1895.
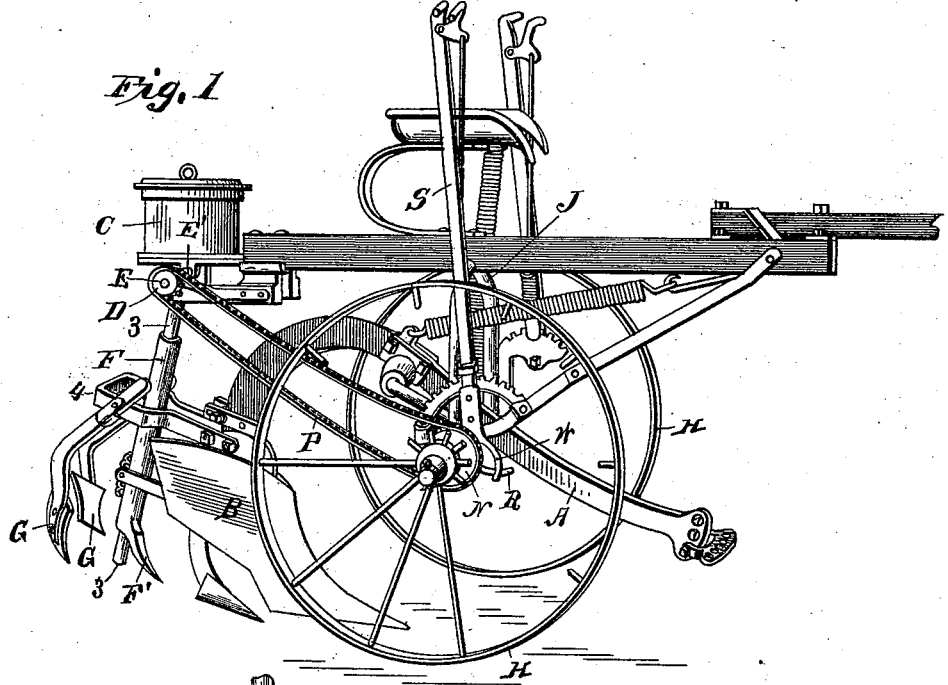
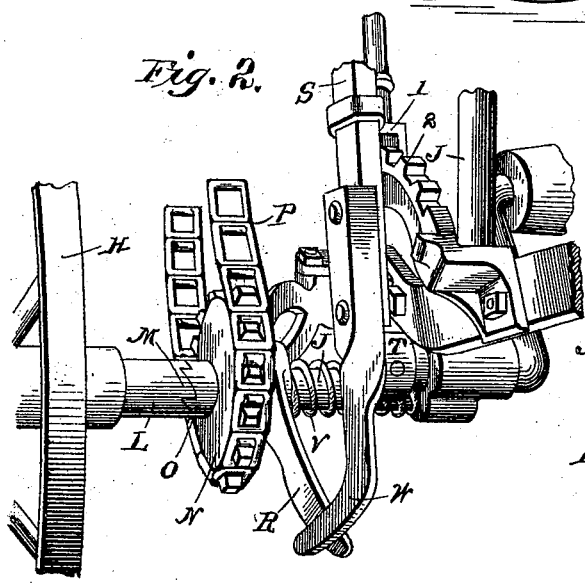
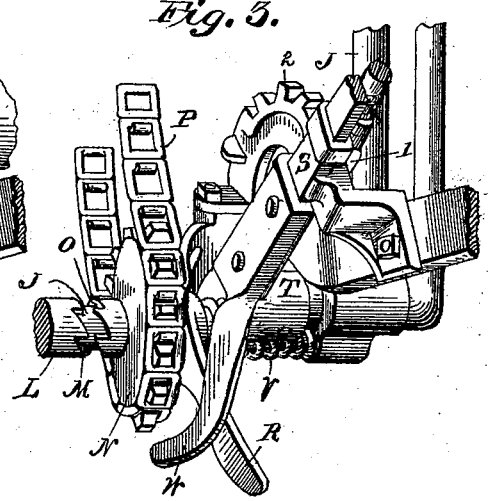
Witnesses.
Howard W. Orr
Herbert C. Lewis
Inventor,
Charles S. Ruef.
By John G. Manahan,
Atty.

UNITED STATES PATENT OFFICE.

CHARLES S. RUEF, OF DIXON, ILLINOIS, ASSIGNOR TO THE GRAND DETOUR PLOW COMPANY, OF SAME PLACE.

RIDING-LISTER.

SPECIFICATION forming part of Letters Patent No. 549,258, dated November 5, 1895.

Application filed August 14, 1895. Serial No. 559,222. (No model.)

*To all whom it may concern:*

Be it known that I, CHARLES S. RUEF, a citizen of the United States, residing at Dixon, in the county of Lee and State of Illinois, have invented certain new and useful Improvements in Riding-Listers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in riding-listers; and it consists, mainly, in certain novel mechanism by which the raising of the plow for the purpose of turning or transportation coincidently suspends the operation of the seeding mechanism and that such operation continues to be so suspended until the plow is lowered again to its working position and the seeding caused to recommence. Thus the operation of the plow and that of the seeding mechanism are not only coincidently intermitted, but the operation of the two departments is so interconnected that the one cannot be operated without the other.

I am aware that it has been heretofore attempted to cause the raising and lowering of the plow to set in operation or to suspend the operation of the seeding mechanism, as the case may be; but my invention consists in novel and efficient means for accomplishing that purpose in a more direct, positive, and certain manner.

As my invention pertains more especially to the mode of driving and intermitting the seed mechanism, and is applicable to most, if not all, of the various types of listers now in use, and the other main features of the machine are well known or easily understood, I do not deem it necessary to specifically describe the entire machine or any more of the parts thereof than will be essential to a clear understanding of the construction, relation, location, and operation of my invention.

I accomplish the aforesaid purpose by the construction illustrated in the accompanying drawings, in which—

Figure 1 is a perspective of a machine embodying my invention. Fig. 2 is a detail of the junction of the seed-driving sprocket-wheel with the hub of one of the ground-wheels and the adjunctive parts, showing the seed mechanism in gear. Fig. 3 is the same with said sprocket-wheel withdrawn from engagement with said hub.

Similar letters and numerals refer to similar parts throughout the several views.

A is the plow-beam, B the plow, and C the seed-hopper, in the base of which latter is seated the usual rotary seed-plate actuated by the small sprocket-wheel D, seated on the shaft E, which has a suitable geared connection with said seed-plate.

F is the portion of the seed-tube adapted to deposit the seed in the rear of the plow B, and is provided at its lower end with a forwardly-projecting shovel F' to open a passage for its lower extremity through the earth at the bottom of the furrow or through any casual obstructions.

G G are the covering-shovels, attached in any suitable mode to the beam A and have their operation in the rear of the seed-tube F to cover the seed deposited thereby.

H H are the carrying-wheels interconnected by the bowed axle J, which is pivoted at its central bend to the beam A. One of the wheels H is provided with an elongated hub L and is seated on one of the horizontal ends of the axle J. The inner end of said hub is provided with a clutch M. A sprocket-wheel N is also seated within the hub L on the axle J and is provided outwardly with the clutch O, adapted to be engaged by the clutch M of the hub L, by means whereof the sprocket-wheel N is rotated by the traction of the wheel H when the aforesaid clutches are in engagement. The sprocket-chain P connects the sprocket N with the sprocket-wheel D, and thus said wheel N actuates the seeding mechanism. On the inner portion of the hub of the wheel N, and on the opposite side thereof from the clutch O, there is loosely collared the downwardly-projecting arm R.

The lower end of the hand-lever S is seated rigidly on the axle J by means of a collar T, integral with said lever and attached to said axle a short distance within the sprocket-wheel N. A coiled spring V, acting expansively and seated between the collar T and wheel N, serves to normally hold the clutch O in engagement with the clutch M; but a diagonal prolongation W of the lever S, below its fulcrumed seat, extends across the arm R in position to draw said arm and the wheel N connected therewith toward the center of the machine, when the lever S is thrown forward, thereby disengaging the clutches M and O and intermitting the operation of the seeding mechanism.

The projection W of the lever S has a cam-like formation, so that its rear sweep gradually forces the arm R inward, as aforesaid, and its contrary movement releases said arm, when the action of the spring V automatically compels the engagement aforesaid of the clutches M and O. The same forward movement of the lever S just described imparts a partial rotation to the axle J and throws its bail forward and upward and carries therewith the rear end of beam A and the plow B. The reverse movement of said lever permits the engagement of the said clutches by releasing the arm R coincidently with the lowering of the plow-beam into working position. Thus the raising of the plow out of its working position necessarily causes a suspension of the deposit of seed, and a return of the plow to its working position necessarily sets the seeding mechanism again in operation. The advantage of this intimate connection between the operation of the plow and that of the seed devices is that unless the operator should forget to raise or lower his plow (which he is not likely to do) he cannot fail to make the operation of the seed devices coincident only with that of the plow. A spring pawl 1 seated on the lever S, engages the usual notched quadrant 2, seated on the frame of the machine, and retains the lever S in any selected position.

The lower portion F of the seed-tube is of greater diameter than the upper portion 3, and the portion 3 is projected a suitable distance within the upper end of the portion F, fitting therein with sufficient tightness to exclude dirt, but yet to permit of a vertical play of the part 3 within the part F in the raising or lowering of the plow B in order to obtain the necessary flexibility for the ready entrance and withdrawal of the part 3 of and from the part F in all positions of the plow. The part 3 has a hinged connection at its upper end to the frame of the machine, as shown at E', or it may be of flexible material, and the part F is about centrally pivoted to the horizontal arm 4, which projects rearwardly from the plow B, and the part F is thus permitted to oscillate in a vertical plane in the line of the plow to accommodate itself and part 3 to the various altitudes of the plow.

What I claim as my invention, and desire to secure by Letters Patent of the United States, is—

1. The combination of the beam A, bowed axle J pivotally connected therewith, driving wheel H, provided with a clutch M, lever S seated on said axle and provided with projection W, sprocket wheel N provided with clutch O, adapted to intermittently engage clutch M, arm R collared on said wheel N, and a spring V interposed between said arm and said lever and suitable means for communicating the rotation of the wheel N to the seeding devices, substantially as shown and for the purpose described.

2. In a lister, the combination, with the seeding devices thereof, of a sprocket wheel provided with a clutch hub adapted to intermittently engage the hub of one of the driving wheels, an arm R collared on the inner hub of said sprocket wheel, a bowed axle, a plow beam A seated pivotally on the bow of said axle, and a lever S rigidly seated on said axle and provided with a projection W to engage and withdraw the arm R as said lever is thrown forward, thus coincidently raising the plow and stopping the seeding devices, substantially as shown and for the purpose specified.

3. In a lister, the combination of the sprocket wheel seated within the hub of one of the ground wheels of the machine, and having clutch connection therewith, and chain connection with the seeding devices, a bowed axle, a plow beam pivotally seated thereon, and a hand lever rigidly seated on said axle and provided with a projection W, an arm R collared on the hub of said sprocket wheel and projected within the projection W, and a spring V interposed between said lever and said wheel N and seated against the inner side of said wheel N, substantially as shown and for the purpose described.

In testimony whereof I affix my signature in presence of two witnesses.

CHARLES S. RUEF.

Witnesses:
 MOSES COOKSON,
 F. T. HORSEMAN.